(12) United States Patent
Schuermann et al.

(10) Patent No.: US 9,975,806 B2
(45) Date of Patent: May 22, 2018

(54) PLANT FOR PRODUCING CEMENT CLINKER WITH GASIFICATION REACTOR FOR DIFFICULT FUELS

(71) Applicant: KHD Humboldt Wedag GmbH, Cologne (DE)

(72) Inventors: Heiko Schuermann, Leverkusen (DE); Marc Feiss, Cologne (DE)

(73) Assignee: KHD HUMBOLDT WEDAG GMBH, Cologne (DE)

( * ) Notice: Subject to any disclaimer, the term of this patent is extended or adjusted under 35 U.S.C. 154(b) by 117 days.

(21) Appl. No.: 14/782,437

(22) PCT Filed: Apr. 4, 2014

(86) PCT No.: PCT/EP2014/056822
§ 371 (c)(1),
(2) Date: Oct. 5, 2015

(87) PCT Pub. No.: WO2014/166838
PCT Pub. Date: Oct. 16, 2014

(65) Prior Publication Data
US 2016/0046525 A1    Feb. 18, 2016

(30) Foreign Application Priority Data

Apr. 11, 2013    (DE) .......................... 10 2013 006 236

(51) Int. Cl.
C04B 7/44    (2006.01)
C04B 7/43    (2006.01)
(Continued)

(52) U.S. Cl.
CPC ............ C04B 7/4446 (2013.01); C04B 7/434 (2013.01); C04B 7/44 (2013.01); C04B 7/47 (2013.01);
(Continued)

(58) Field of Classification Search
CPC ......... C04B 7/4446; C04B 7/434; C04B 7/47; C04B 7/44; F27B 7/08; F27B 2007/025
(Continued)

(56) References Cited

U.S. PATENT DOCUMENTS 6,461,153 B2 *  10/2002  Eckert .................... C04B 7/364
                                                            106/752
6,626,662 B2     9/2003  Ramesohl et al.
(Continued)

FOREIGN PATENT DOCUMENTS

DE    3320670    12/1984
DE    3411144    10/1985
(Continued)

OTHER PUBLICATIONS

International Search Report, dated Jun. 27, 2014.

*Primary Examiner* — Alissa Tompkins
*Assistant Examiner* — Benjamin W Johnson
(74) *Attorney, Agent, or Firm* — Greer, Burns & Crain Ltd.

(57) ABSTRACT

A plant for producing cement clinker, comprising as viewed in the direction of materials flow, a heat exchanger to preheat raw meal, a downstream calciner to calcine the raw meal, a rotary kiln to sinter the calcined raw meal, and a clinker cooler to cool the sintered cement clinker. A combustion device which carbonizes, pyrolysis or burns difficult fuels, is embodied as a pot reactor or gooseneck reactor in an inverted U-shape, and is positioned upstream of the calciner on the flow path of the exhaust gases from the rotary kiln to the calciner, and has a gas outlet that opens out above a tertiary-air line of the clinker cooler into the calciner. As a result, it becomes possible to burn fuel which is lumpy and/or has poor ignitability, and the gases from incomplete combustion in the reactor are available in the calciner in gaseous form for further combustion.

6 Claims, 1 Drawing Sheet

(51) Int. Cl.
*C04B 7/47* (2006.01)
*F27B 7/02* (2006.01)
*F27B 7/08* (2006.01)

(52) U.S. Cl.
CPC .......... *F27B 7/08* (2013.01); *F27B 2007/025* (2013.01); *Y02P 40/126* (2015.11)

(58) Field of Classification Search
USPC .................................... 432/1, 11, 13, 14, 18
See application file for complete search history.

(56) References Cited

U.S. PATENT DOCUMENTS

| | | |
|---|---|---|
| 8,021,479 B2 | 9/2011 | Mohr et al. |
| 8,695,515 B2 | 4/2014 | Jensen et al. |
| 2002/0172907 A1* | 11/2002 | Tseng ...................... F23D 14/06 431/354 |
| 2003/0079371 A1* | 5/2003 | Eckert ...................... C04B 7/43 34/595 |
| 2007/0234940 A1* | 10/2007 | Thomsen .............. C04B 7/4423 110/346 |

FOREIGN PATENT DOCUMENTS

| | | |
|---|---|---|
| DE | 3520447 | 12/1986 |
| DE | 202007006797 | 9/2008 |
| DE | 102012016361.4 | 5/2014 |
| EP | 0764614 | 3/1997 |
| EP | 1334954 | 8/2003 |
| EP | 1926959 | 6/2008 |
| WO | 0109548 | 2/2001 |
| WO | 2005108892 | 11/2005 |
| WO | 2008120109 | 10/2008 |
| WO | 2010032149 | 3/2010 |

\* cited by examiner

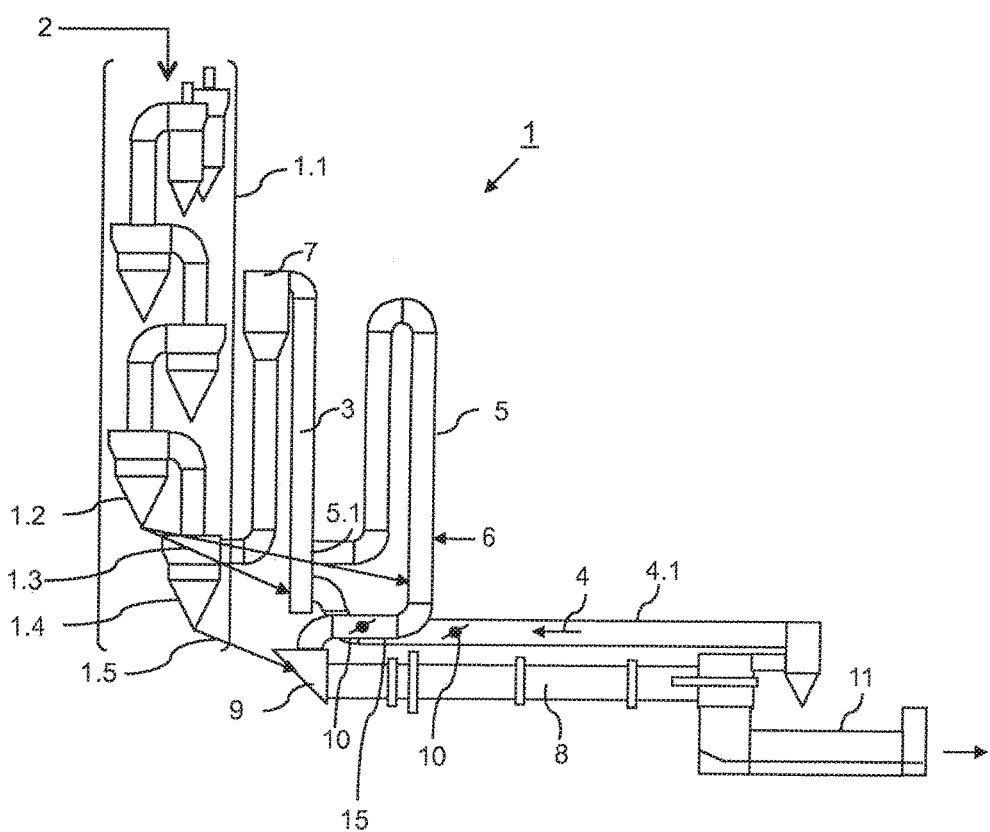

PLANT FOR PRODUCING CEMENT CLINKER WITH GASIFICATION REACTOR FOR DIFFICULT FUELS

CROSS-REFERENCES TO RELATED APPLICATIONS

This application claims the benefit of the German patent application No. 10 2013 006 236.5 filed on Apr. 11, 2013, the entire disclosures of which are incorporated herein by way of reference.

BACKGROUND OF THE INVENTION

The invention relates to a plant for producing cement clinker, having, viewed in the material flow direction, at least one heat exchanger for preheating raw meal, at least one downstream calcinator for calcining the raw meal, at least one rotary kiln for sintering the calcinated raw meal, at least one clinker cooler for cooling the sintered cement clinker, wherein a combustion device for difficult fuels, which have unpredictable ignition behavior, generally ignite poorly, or require an ignition aid in the form of strong heating and also initial pyrolysis, carbonizes, pyrolyzes, and/or combusts the difficult fuels, and a method corresponding thereto for the production of cement.

To produce cement clinker, a mixture of calciferous rock and siliceous rock is ground and subjected to a heat treatment, during which the lime contained in the raw meal is formally freed of carbon dioxide ($CO_2$) and converted into burnt lime ($CaO$). In a further step, the raw meal, which is deacidified by the freeing from $CO_2$, and which consists of the deacidified calciferous rock and of the siliceous rock, which is not yet changed here, is sintered in heat to form various calcium silicate phases.

The deacidification and also the sintering of raw meal are endothermic processes, which require thermal energy for the reaction thereof. The heat energy required for producing cement clinker is supplied to the process by combusting various fuels. High-quality fuels, which therefore also have a high caloric value, are supplied in a plant for producing cement clinker at important points to generate high temperatures, for example, a burner for generating high temperatures in a rotary kiln for sintering to form calcium silicate. At other points, at which generating high temperatures is less important than generating reductive conditions, fuels having a lower caloric value can also be used, for example, the combustion of dried household garbage, animal cadavers, shredded automobile tires, combustion of solvent wastes, or old paper. Other fuels available in larger quantities, which only ignite with difficulty, are petcoke, anthracite, high ash coals, and also alternative fuels made of industrial or community wastes. A substantial driver of costs of the variable costs in the production of cement is the price for fuels. The available fuels have different qualities with respect to combustibility, caloric value, moisture, flashpoint, and content of metals and other harmful materials, which cannot be destroyed by combustion.

So-called difficult fuels have unpredictable ignition behavior, typically ignite poorly or require an ignition aid in the form of strong heating and possibly initial pyrolysis. To employ these difficult fuels, a transition has therefore been made to pyrolyzing, carbonizing, and/or slowly combusting them with circulation and heating using a burner in a carbonizing furnace provided separately for this purpose.

In the case of carbonization of such difficult fuels, usually coarse, chunky waste materials, in a rotary kiln, however, it causes difficulties to provide uniform conditions for the thermal treatment, in particular to avoid the occurrence of temperature spikes, which can result in undesired solid baked-on deposits in the rotary kiln.

A cement clinker production line is known from EP 0764614 A1, having a separate shaft gasifier, which is installed adjacent to the calcining unit and is operated as a secondary reactor, in which coarse, chunky waste materials, in particular old tires, are to be gasified. In this case, the shaft gasifier is charged from above with the old tires and with a part of the tertiary air coming from the clinker cooler as the gasification agent. The product gas arising in the shaft gasifier is conducted as combustion gas into the calcinator, and the residual materials of the old tires gasified in the shaft gasifier are transported by a mechanical injection device into the rotary kiln intake shaft. The gasification process in the shaft gasifier can be subject to substantial variations, since the old tires stacked on one another in the shaft gasifier are not rearranged during their thermal treatment. An introduction of raw meal into the shaft gasifier, which thermally treats waste materials, in particular old tires, does not occur.

A cement clinker production line is known from WO 200109548, adjacent to the calcinator of which a separate reactor is installed, which is again filled from above with waste materials, which are to be combusted in the reactor using tertiary air from the clinker cooler. A partial stream of the cement raw meal is also introduced into the reactor likewise from above. The waste materials and the raw meal partial stream are to be deposited in the combustion reactor on a rotatable disk installed above the reactor floor, and the thermally treated solids are to be spun out by the rotation of the disk and spun into the calcinator or into the rotary kiln intake, and the combustion exhaust gas is also introduced into the calcinator. Mixing of the waste materials, particularly when they are provided in coarse, chunky form, also does not occur in the known combustion reactor, so that uniform combustion conditions and therefore uniform raw meal pre-calcination are not to be presumed.

In a plant for producing cement clinker with utilization of waste materials having high caloric value, from DE 3320670 A, DE 3411144 A, and DE 3520447 A, carbonizing or combusting the waste materials in a separate rotary kiln and using the carbonization gas/exhaust gas during the thermal raw meal treatment is also known. However, no cement raw meal is introduced into the carbonizing furnace/combustion furnace.

A method for firing raw materials such as cement raw meal, limestone, or other mineral raw materials is described in WO 2010032149. According to the method described therein, raw meal and a secondary fuel are placed separately from one another in the same rotary kiln.

A device and a method for producing cement clinker from cement raw material is disclosed in EP 1926959 A1, wherein dusts are heat-treated with the aid of combustion air and fuel in a dust burner reactor provided separately for this purpose, which is embodied as a rotary kiln. In this case, at least a part of the tertiary air is supplied as combustion air to the dust burner reactor and the dusts to be treated and the combustion air pass through the dust burner reactor in flow in the same direction. The location above the rotary kiln is provided as the location of the dust burner reactor for sintering the calcium silicate phases, the cement clinker.

A plant for producing cement having a further carbonizing furnace, which is used for carbonizing or combusting difficult waste materials, is disclosed in EP 1334954 B1. This carbonizing furnace is embodied as a rotary kiln and, according to the teaching of EP 1334954 B1, is to be arranged in parallel to the rotary kiln for sintering the calcium silicate phases, the cement clinker. According to the teaching of this document, arranging the rotary kiln for carbonizing and/or combusting the difficult fuels above the rotary kiln in the region of the calcinator is provided as a particularly advantageous location in the plant.

Finally, a carbonizing furnace embodied as a rotary kiln, which is not arranged above the rotary kiln for sintering the raw meal, but rather approximately at the same height as the rotary kiln, is disclosed in patent application DE 102012016361.4, wherein this carbonizing furnace is arranged as an extension of the rotary kiln for sintering. The pyrolysis gases exiting from this carbonizing furnace are used in the calcinator as a shared vertical duct for the exhaust gases of the rotary kiln and the carbonizing furnace for calcining the raw meal.

However, the above-mentioned carbonizing furnaces have the disadvantage that they place high mechanical demands on the structural foundation and require very substantial plant investments as moving parts.

SUMMARY OF THE INVENTION

The object of the invention is therefore to provide a plant for producing cement with a combustion device for difficult fuels, which overcomes the disadvantages of the prior art.

The object on which the invention is based is achieved in that the combustion device is embodied as a pot reactor or gooseneck reactor in inverted U-shape, which is connected upstream from the calcinator on the flow path of the exhaust gases of the rotary kiln to the calcinator, and the gas outlet of which opens into the calcinatory above a tertiary air line from the cooler.

It is provided according to the invention that the difficult fuels are carbonized, pyrolyzed, and/or combusted in a pot reactor or gooseneck reactor, which is arranged between the rotary kiln and the calcinator. The goal of the invention is to perform the difficult combustion outside the actual calcinator, so that the still combustible exhaust gases of the reactor can be conducted into the calcinator, where the combustible exhaust gases are used as a heat supplier during the combustion using tertiary air. In the calcinator, where the calcining, i.e., the deacidification of the raw meal takes place, clean gas combustion therefore occurs, so that chunky fuels do not fall downward in the calcinator or interfere with the deacidification procedure. If fuels nonetheless reach the calcinator uncombusted and combust further therein, emergency emptying into the furnace intake chamber is provided for this purpose in the lower point at the base of the calcinator in one embodiment of the invention, to empty coarse pieces of fuel into the rotary kiln. The carbonization, pyrolysis, or combustion of the difficult fuels can therefore be separated from the actual calcinator, which, due to the increasing use of alternative fuels, as a combustion point for difficult fuels can no longer fulfill its task of calcining sufficiently.

It is important during the carbonization, the pyrolysis, and/or the combustion that they occur under substoichiometric supply of air oxygen. In this case, the formation of carbon monoxide (CO) is of subordinate significance. Rather, the formation of still combustible gases is important, so that the fuels which are difficult to ignite reach the calcinator in the gaseous state or in the degassed, solid state. The pyrolysis gases can contain soot in this case, and can also have higher carbon compounds than only carbon monoxide. It is important that the reactor supplies a combustible exhaust gas or a thermally pretreated solid fuel, which combusts in the calcinator, free of chunky fuel residues, in the presence of raw meal to be de-acidified with the aid of the tertiary air supplied to the calcinator. To be able to embody the carbonization, pyrolysis, or combustion variably and also to be able to control the heat development inside the plant, it is provided according to one embodiment of the invention that fuel which is difficult to ignite flows in variable proportions of 10% to 100% into the gooseneck reactor and/or the calcinator. The reactor can thus be operated with a minimum quantity of 10% fuel, so that the reactor only carbonizes, pyrolyzes, or combusts a small part of the difficult fuels, but it can also be provided that the reactor combusts all variable proportions between 10% and 100% of the difficult fuel in the allocation between reactor and calcinator. In one embodiment of the invention, preheated raw meal can flow in variable proportions of 10% to 100% into the gooseneck reactor and/or the calcinator. Depending on the properties of the fuel which is difficult to ignite, it can be advantageous to already use the heat in the reactor for the calcining, and the raw meal can be conducted into the reactor to control the temperature during the carbonization, the pyrolysis, or the combustion, so that the temperature does not become excessively high and the carbonization, pyrolysis, and/or combustion process is thus accelerated excessively strongly. The goal of the invention is to combust the exhaust gases from the reactor in the calcinator. In addition, the fuels which are difficult to ignite are not to react fully in the reactor.

Depending on the burn-off speed of the fuel which is carbonized, pyrolyzed, or combusted in the reactor, it can be advantageous to provide a swirl chamber approximately at the reversal point of the reactor designed as a gooseneck reactor. This swirl chamber ensures intensive mixing of the fuel which is difficult to ignite with the hot exhaust air of the rotary kiln, so that the dwell time of the possibly chunky fuel in the reactor lasts longer and it is completely carbonized and/or pyrolyzed therein to form a still combustible exhaust gas.

The plant according to the invention for producing cement can have an interruption between rotary kiln intake chamber, which is arranged at the end of the rotary kiln, and the calcinator and can also be completely separated from the rotary kiln intake chamber in one embodiment of the invention. In this case, all of the exhaust gas of the rotary kiln, i.e., burn-off gases of the primary fuel combusted in the rotary kiln with primary air and the secondary air sucked into the rotary kiln from the clinker cooler, flow via the reactor into the calcinator, and do so above the inflow point of the tertiary air taken from the clinker cooler. In this embodiment of the invention, the tertiary air is used in the calcinator primarily as lifting air for the raw meal flowing in from the second-lowermost cyclone heat exchanger of the preheater, which is furthermore used at the height of the injection point of the burn-off gases from the reactor as the combustion air for the burn-off gases. The heat arising in this case, which results in further expansion of the gases, results in boosting of the gas flow, which entrains the raw meal during the calcining in the lowermost cyclone preheat exchanger stage, where the raw meal is branched off for the feed line into the rotary kiln.

So as not to cause the lifting work to become excessively strong for the burn-off gas, whereby the gas can cool down, on the one hand, but also whereby the pressure drop in the reactor can become excessively strong for a desired flow strength, in one embodiment of the invention, it is provided that the reversal point of the reactor designed as a gooseneck reactor lies below the reversal point of the calcinator.

BRIEF DESCRIPTION OF THE DRAWINGS

The invention will be explained in greater detail on the basis of the following FIGURE.

The FIGURE shows a plant according to the invention for producing cement clinker having a reactor designed as a gooseneck reactor.

DETAILED DESCRIPTION OF THE PREFERRED EMBODIMENTS

The FIGURE shows a plant 1 according to the invention for producing cement clinker, in which raw meal 2 is put into the preheater 1.1. The raw meal 2 passes through the individual cyclone preheater stages of the preheater 1.1 from top to bottom in counterflow to the exhaust air rising in the preheater 1.1 from the calcinator 3. Heat is generated in the calcinator 3 with the addition of fuel, which deacidifies the raw meal 2, i.e., in an endothermic reaction, chemically removes carbon dioxide (CO2) formally from the lime (CaCO3) contained in the raw meal 2, so that burned lime remains as calcium oxide (CaO). Arriving at cyclone preheater stage 1.2, the preheated raw meal 2 is conducted via a line 1.3 into the base of the calcinator 3, where the raw meal 2 is entrained by tertiary air 4, which originates from a clinker cooler 11, into a tertiary air line 4.1. At this point, the raw meal 2 flows with the gas, which otherwise flows in counterflow, into the plant 1, which it flows toward. During the mutual rising in the calcinator 3, the raw meal 2 from line 1.3 and the tertiary air 4 from tertiary air line 4.1 pass the inflow point at the gas outlet 5.1 for the exhaust gas, which is flowing in from the reactor 5, from the carbonization, pyrolysis, and/or combustion of fuel 6, which is difficult to ignite, and which is generated in the plant 1 shown here in a gooseneck reactor to produce cement clinker. The exhaust gas from the reactor 5 burns in the calcinator 3 and generates a substantial quantity of heat therein, which goes into the endothermic de-acidification reaction taking place therein. The calcinator 3 shown here has a swirl chamber 7 at the end of the calcinator 3, where the burn-off gas and optionally the fuel injected into the calcinator 3 can burn off completely, before the exhaust gas of the calcinator 3 flows into the heat exchanger 1.1, because material reaction is no longer to occur in the heat exchanger 1.1 if possible. During the passage of the lowermost cyclone heat exchanger stage 1.4, the raw meal 2 is separated off and introduced through a line 1.5 into the rotary kiln intake chamber 9, where the raw meal 2 is heated further for sintering in the rotary kiln 8. To allocate the allocation of the gas flows in the calcinator 3 between tertiary air line 4.1 and reactor path, a flap system 10 is provided, using which the air can be allocated between tertiary air line 4.1 and reactor 5. The fuel 6 which is difficult to ignite is ignited at a combustion point in the reactor 5, where it only burns off, carbonizes, or pyrolyzes in the heat of the rotary kiln exhaust gas slowly because it is difficult to ignite, however.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 1 plant
1.1 preheater
1.2 cyclone heat exchanger stage
1.3 line
1.4 cyclone heat exchanger stage
1.5 line
2 raw meal
3 calcinator
4 tertiary air
4.1 tertiary air line
5 reactor
5.1 inflow point/gas outlet
6 fuel
7 swirl chamber
8 rotary kiln
9 rotary kiln intake chamber
10 flap system
11 clinker cooler

The invention claimed is:

1. A plant for producing cement clinker, comprising:
at least one heat exchanger for preheating raw meal;
at least one downstream calcinator for calcining raw meal received from the at least one heat exchanger, the calcinator having a first leg for guiding raw material upwardly and a second leg for guiding raw material downwardly, the two legs being joined by a reversal point arranged at a first height;
at least one rotary kiln for sintering calcinated raw meal received from the calcinator into sintered cement clinker, the rotary kiln being fed with primary air for combustion of fuel in the rotary kiln;
at least one clinker cooler for cooling sintered cement clinker received from the rotary kiln, wherein cooling is obtained via a flow of air through the clinker cooler, a portion of which is drawn in as secondary air into the rotary kiln; and
a combustion device for difficult fuels, which have unpredictable ignition behavior, ignite poorly, or require an ignition aid in the form of heating, wherein the combustion device is configured and arranged to at least one of initially pyrolyze or carbonize the difficult fuels;
wherein the combustion device comprises a gooseneck reactor that has an inverted U-shape formed by a first leg and a second leg that are connected by an inverted U-shaped connection;
wherein the gooseneck reactor is connected upstream from the calcinator on a flow path of exhaust gases from the rotary kiln to the calcinator;
wherein exhaust gases from the rotary kiln are introduced at a lower end of the gooseneck reactor and then flow upwardly through the first leg of the gooseneck reactor before flowing through the inverted U-shaped connection and then downwardly into the second leg of the gooseneck reactor;
wherein the difficult fuels are introduced into the gooseneck reactor in the first leg of the gooseneck reactor and flow upwardly with the exhaust gases from the rotary kiln;

wherein a gas outlet of the combustion device is disposed in the second leg of the gooseneck reactor and opens into the calcinator at an elevation above a tertiary air line connection from the clinker cooler to the calcinator;

wherein the U-shaped connection of the gooseneck reactor has a height which is below the first height of the reversal point of the calcinator;

wherein the difficult fuels reach the calcinator in a gaseous state or in a degassed, solid state; and wherein the calcinator does not have a direct connection to the rotary kiln.

2. The plant as claimed in claim 1, wherein the gooseneck reactor has a swirl chamber as a burn-off chamber in a region of the inverted U-shape.

3. A method for producing cement, comprising the following steps:

preheating raw meal in a preheater stage;

calcining the raw meal in a calcinator, the calcinator having a first leg for guiding raw material upwardly and a second leg for guiding raw material downwardly, the two legs being joined by a reversal point arranged at a first height;

sintering the calcinated raw meal in a rotary kiln;

cooling the sintered raw meal in a clinker cooler with cooling air which becomes heated, the heated cooling air of the clinker cooler being partially guided in the form of air for the recuperation of heat in the calcinator; and partially combusting difficult fuels in a reactor, with a remaining combustion of the difficult fuels occurring in the calcinator;

wherein the reactor comprises a gooseneck reactor that has an inverted U-shape formed by a first leg and a second leg that are connected by an inverted U-shaped connection;

wherein the gooseneck reactor is connected upstream from the calcinator on a flow path of exhaust gases from the rotary kiln to the calcinator;

wherein exhaust gases from the rotary kiln are introduced at a lower end of the gooseneck reactor and then flow upwardly through the first leg of the gooseneck reactor before flowing through the inverted U-shaped connection and then downwardly into the second leg of the gooseneck reactor;

wherein the difficult fuels are introduced into the gooseneck reactor in the first leg of the gooseneck reactor and flow upwardly with the exhaust gases from the rotary kiln;

wherein a gas outlet of the reactor is disposed in the second leg of the gooseneck reactor and opens into the calcinator at an elevation above a tertiary air line connection from the clinker cooler to the calcinator;

wherein the U-shaped connection of the gooseneck reactor has a height which is below the first height of the reversal point of the calcinator; and wherein the calcinator does not have a direct connection to the rotary kiln.

4. The method as claimed in claim 3, wherein the reactor is supplied with a substoichiometric supply of air oxygen.

5. The method as claimed in claim 3, including a step of directing a flow of difficult fuel into at least one of the gooseneck reactor and the calcinator, with the amount directed into the gooseneck reactor being in variable proportions of 10% to 100%.

6. The method as claimed in claim 3, wherein the raw meal is injected from the preheater into one or the other of the calcinator and the reactor in a variable allocation of 10% to 100% for each of the reactor and the calcinator.

* * * * *